(12) United States Patent
Han et al.

(10) Patent No.: US 11,340,900 B2
(45) Date of Patent: May 24, 2022

(54) FLUSHING DIRTY PAGES FROM PAGE BUFFERS INDICATED BY NON-SEQUENTIAL PAGE DESCRIPTORS

(71) Applicant: EMC IP Holding Company LLC, Hopkinton, MA (US)

(72) Inventors: Geng Han, Beijing (CN); Philippe Armangau, Acton, MA (US); Jian Gao, Beijing (CN); Vamsi K. Vankamamidi, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 106 days.

(21) Appl. No.: 16/864,764

(22) Filed: May 1, 2020

(65) Prior Publication Data
US 2021/0342153 A1 Nov. 4, 2021

(51) Int. Cl.
*G06F 12/123* (2016.01)
*G06F 9/30* (2018.01)
*G06F 9/50* (2006.01)
*G06F 12/0882* (2016.01)
*G06F 9/54* (2006.01)

(52) U.S. Cl.
CPC ........ *G06F 9/30047* (2013.01); *G06F 9/5016* (2013.01); *G06F 9/5022* (2013.01); *G06F 9/544* (2013.01); *G06F 12/0882* (2013.01); *G06F 12/123* (2013.01); *G06F 2209/5011* (2013.01); *G06F 2212/7201* (2013.01)

(58) Field of Classification Search
None
See application file for complete search history.

(56) References Cited

U.S. PATENT DOCUMENTS

| 4,636,946 | A | * | 1/1987 | Hartung | G06F 12/0804 711/113 |
| 5,392,415 | A | * | 2/1995 | Badovinatz | G06F 12/123 707/999.202 |
| 5,551,002 | A | * | 8/1996 | Rosich | G06F 12/123 711/134 |
| 10,394,452 | B2 | * | 8/2019 | Erdmann | G06F 16/2246 |

(Continued)

OTHER PUBLICATIONS

Jiang et al. "DULO: An Effective Buffer Cache Management Scheme to Exploit Both Temporal and Spatial Locality." Dec. 2005. USENIX. FAST '05. pp. 101-114.*

(Continued)

*Primary Examiner* — Nathan Sadler
(74) *Attorney, Agent, or Firm* — BainwoodHuang

(57) ABSTRACT

Dirty pages of cached user data are persistently stored to page buffers that are allocated from a page buffer pool in a persistent data storage resource of a data storage system, and are indicated by page descriptors that are stored at a head of a temporally ordered page descriptor ring as the dirty pages are stored to the page buffers. The disclosed technology performs a flush operation by selecting a work-set of non-sequential page descriptors within the page descriptor ring, flushing dirty pages from page buffers indicated by the page descriptors in the work-set to non-volatile data storage drives of the data storage system, and storing, for each one of the page buffers indicated by the page descriptors in the work-set, an indication that the page buffer is available for re-use.

17 Claims, 14 Drawing Sheets

(56) References Cited

U.S. PATENT DOCUMENTS

| | | | |
|---|---|---|---|
| 10,417,137 B2 | 9/2019 | Li et al. | |
| 10,635,323 B2 | 4/2020 | Yan et al. | |
| 10,740,187 B1 | 8/2020 | Prabhakar et al. | |
| 10,761,989 B2 | 9/2020 | Gao et al. | |
| 10,810,123 B1* | 10/2020 | Xu | G06F 12/0246 |
| 10,860,494 B2 | 12/2020 | Li et al. | |
| 2018/0089095 A1* | 3/2018 | Li | G06F 12/0882 |
| 2021/0034573 A1* | 2/2021 | Heng | G06F 11/1076 |

OTHER PUBLICATIONS

Zhao et al. "2C: A New Approach to Design the Second Level Buffer Cache." Oct. 2008. IEEE. International Conference on Grid and Cooperative Computing. pp. 56-61.*

* cited by examiner

TAIL MARKER 700

| LOCATION 702 OF TAIL MARKER IN PAGE DESCRIPTOR RING | LOCATIONS 704 IN PAGE DESCRIPTOR RING OF ALL PAGE DESCRIPTORS PROCESSED IN LAST COMPLETED FLUSH OPERATION THAT ARE LOCATED ABOVE THE UPDATED TAIL | LOCATION 706 OF UPDATED TAIL IN PAGE DESCRIPTOR RING AFTER LAST COMPLETED FLUSH OPERATION (CURRENT TAIL) | OTHER DATA 708 |
|---|---|---|---|

1400
PERSISTENTLY STORE DIRTY PAGES OF CACHED USER DATA RECEIVED BY A DATA STORAGE SYSTEM TO PAGE BUFFERS THAT ARE ALLOCATED FROM A PAGE BUFFER POOL AND INDICATED BY CORRESPONDING PAGE DESCRIPTORS THAT ARE STORED AT A HEAD OF A TEMPORALLY ORDERED PAGE DESCRIPTOR RING AS THE DIRTY PAGES ARE STORED TO THE PAGE BUFFERS

1402
PERFORM A FLUSH OPERATION BY SELECTING A WORK-SET OF NON-SEQUENTIAL PAGE DESCRIPTORS WITHIN THE PAGE DESCRIPTOR RING, FLUSHING DIRTY PAGES FROM PAGE BUFFERS INDICATED BY THE PAGE DESCRIPTORS IN THE WORK-SET TO NON-VOLATILE DATA STORAGE DRIVES OF THE DATA STORAGE SYSTEM, AND STORING, FOR EACH ONE OF THE PAGE BUFFERS INDICATED BY THE PAGE DESCRIPTORS IN THE WORK-SET, AN INDICATION THAT THE PAGE BUFFER IS AVAILABLE FOR RE-USE

Fig. 14

FLUSHING DIRTY PAGES FROM PAGE BUFFERS INDICATED BY NON-SEQUENTIAL PAGE DESCRIPTORS

TECHNICAL FIELD

The present disclosure relates generally to intelligent data storage systems that cache received user data, and more specifically to technology for performing a flush operation that flushes dirty pages from page buffers indicated by a work-set of non-sequential page descriptors in a temporally ordered page descriptor ring, such that the page buffers indicated by the work-set are available for re-use after the flushing operation.

BACKGROUND

Data storage systems are arrangements of hardware and software that may include one or more storage processors coupled to non-volatile data storage drives, such as solid state drives and/or magnetic disk drives. Each storage processor may service host I/O requests received from physical and/or virtual host machines ("hosts"). The host I/O requests received by the storage processor may specify one or more storage objects (e.g. logical units ("LUNs"), and/or files etc.) that are hosted by the storage system and store user data that is written and/or read by the hosts. Each storage processor executes software that processes host I/O requests and performs various data processing tasks to organize and secure the user data that is received from the hosts and stored in the non-volatile data storage drives of the data storage system.

While processing host I/O requests that read and write user data stored in the non-volatile data storage of the data storage system, user data may be stored in a cache within the storage processor, e.g. before it is subsequently stored into back-end non-volatile data storage drives. Successful storage of user data in the cache may enable the data storage system to promptly acknowledge successful completion of corresponding host I/O write requests. Caching of user data may further enable the data storage system to service subsequently received host I/O read requests directed to the same data without delays caused by accessing non-volatile data storage drives of the data storage system. User data stored in the cache may be moved to the back-end non-volatile data storage drives of the data storage system by flush operations performed by the storage processor.

Pages of user data stored in the cache are considered dirty when they contain user data written that has not yet been stored in the non-volatile data drives of the data storage system. To provide a high level of data availability, a storage processor may store cached dirty pages into a persistent data storage resource prior to the dirty pages being flushed to the back-end non-volatile data storage drives.

SUMMARY

When storing cached dirty pages into persistent data storage prior to flushing the dirty pages to the non-volatile data storage drives of a data storage system, it may be necessary to maintain a page-specific temporal ordering indicating the order in which the dirty pages were received and stored into the persistent data storage resource. Some data storage systems preserve this temporal ordering by storing page descriptors into a circular page descriptor ring, where each page descriptor stored in the ring indicates a page buffer in the persistent data storage resource that stores a dirty page from the cache. As each dirty page is stored into the persistent data storage resource, a page descriptor is stored at a head of the page descriptor ring, and is used to indicate a data buffer used to store the dirty page.

When a flush operation is performed to flush dirty pages from page buffers to the non-volatile data storage drives, a work-set of multiple page descriptors is selected within the page descriptor ring, including a page descriptor located at a tail of the page descriptor ring. During the flush operation, the dirty pages stored in the page buffers indicated by the page descriptors in the work-set are moved ("flushed") to the non-volatile data storage drives of the data storage system.

When performing a flush operation, it may be desirable to select a work-set for flushing that is made up of non-sequential page descriptors within the page descriptor ring. For example, where one or more mapping trees are used to map logical block addresses of user data pages to physical locations where the pages are stored in the non-volatile data storage drives, it may provide higher performance to select and process a work-set of page descriptors that indicate page buffers storing dirty pages having logical block addresses that are mapped by a single branch of a mapping tree. Such a desirable work-set of page descriptors may be stored non-sequentially within the temporally ordered page descriptor ring.

Previous data storage systems have had significant shortcomings when performing flush operations on work-sets of page descriptors that are non-sequential within the page descriptor ring. After completion of a flush operation, the tail of the page descriptor ring is moved forward past any sequential page descriptor(s) in the work-set that are adjacent to the tail before the flush operation. As a result, the tail is moved forward to indicate a next page descriptor in the ring that indicates a page buffer that was not flushed, i.e. the next page descriptor in the ring that is not contained in the work-set processed by the flush operation. Accordingly, after processing a work-set made up of non-sequential page descriptors, the new tail position will indicate a page descriptor that is located before one or more of the page descriptors in the work-set that were processed during the flush operation. In some previous systems, page buffers were also organized as a ring, with each page buffer corresponding to one of the page descriptors in the page descriptor ring. In such systems, only page buffers indicated by page descriptors not located from the tail to the head of the page descriptor ring (i.e. only those page buffers indicated by page descriptors from the head to the tail) were available to store new dirty pages. As a result, after completing a flush operation on a work-set consisting of non-sequential page descriptors, those page buffers indicated by page descriptors in the work-set located between the updated tail and the head of the page descriptor ring were still unavailable for storing new dirty pages, even though those page buffers had been flushed by the previously completed flush operation.

To address the above described and other shortcomings of previous technology, new technology is disclosed herein that performs a flush operation by flushing dirty pages from page buffers indicated by a work-set of non-sequential page descriptors contained in a temporally ordered page descriptor ring, such that all the page buffers indicated by the page descriptors in the work-set are available for re-use after completion of the flushing operation. In the disclosed technology, dirty pages of user data received and cached by a data storage system are persistently stored to page buffers that are allocated from a page buffer pool and indicated by page descriptors that are stored at a head of a temporally ordered page descriptor ring as the dirty pages are stored to the page buffers. The disclosed technology performs a flush operation by selecting a work-set of non-sequential page descriptors within the page descriptor ring, flushing dirty pages from page buffers indicated by the page descriptors in the work-set to non-volatile data storage drives of the data storage system, and storing, for each one of the page buffers indicated by the page descriptors in the work-set, an indication that the page buffer is available for re-use.

In some embodiments, a tail of the page descriptor ring may indicate one of the page descriptors in the work-set prior to performing the flush operation. Performing the flush operation may include i) updating the tail of the page descriptor ring to indicate a page descriptor not contained in the work-set and located after a page descriptor in the work-set that was indicated by the tail of the page descriptor ring prior to performing the flush operation, ii) generating a tail marker that stores the updated tail of the page descriptor ring and a location within the descriptor ring of each page descriptor in the work-set processed by the flush operation that is located within the page descriptor ring above the updated tail of the page descriptor ring, and iii) storing the tail marker at the head of the page descriptor ring.

In some embodiments, the page buffers may be allocated from a page buffer pool in a persistent data storage resource that is separate from the non-volatile data storage drives of the data storage system, and the page descriptor ring may be located in a memory of a storage processor of the data storage system.

In some embodiments, the work-set of non-sequential page descriptors within the page descriptor ring may be selected at least in part by selecting page descriptors indicating buffer descriptors that store dirty pages having logical block addresses that are mapped by a single branch of a mapping tree that is used by the storage processor to map logical block addresses to corresponding physical page locations on the non-volatile data storage drives.

In some embodiments, the disclosed technology may maintain, for the page buffer pool, a page buffer allocation bit map, and the page buffer allocation bit map may have a bit for each page buffer in the page buffer pool indicating whether that page buffer is currently available to store a dirty page. The disclosed technology may store the indication, for each one of the page buffers indicated by the page descriptors in the work-set processed by a flush operation, that the page buffer is available for re-use after completion of the flush operation by modifying (e.g. clearing) the bit corresponding to the page buffer in the page buffer allocation bit map to indicate that the page buffer is currently available to store a dirty page.

In some embodiments, the disclosed technology may maintain a persistent page descriptor buffer pool in the persistent data storage resource, the page descriptor buffer pool containing multiple persistent page descriptor buffers. Each page descriptor in the page descriptor ring that indicates a page buffer allocated from the page buffer pool currently storing a dirty page may have associated therewith a persistent page descriptor buffer that is allocated from the page descriptor pool.

In some embodiments, each persistent page descriptor buffer allocated from the persistent page descriptor pool stores a copy of a page descriptor in the page descriptor ring.

In some embodiments, the disclosed technology may overprovision the page descriptor ring such that the page descriptor ring has a total capacity that exceeds a total capacity of the page descriptor pool, e.g. the page descriptor ring may contain a larger total number of page descriptors than the total number of persistent page descriptor buffers in the persistent page descriptor buffer pool.

In some embodiments, the persistent data storage resource may be made up of a battery-backed memory within the data storage system that is separate from the non-volatile data storage drives of the data storage system.

Embodiments of the disclosed technology may provide significant advantages over previous technical solutions. The disclosed technology enables individual flush operations to be performed using work-sets made up of non-sequential page descriptors within a temporally ordered page descriptor ring. Such a work-set may, for example, be advantageously made up of page descriptors that indicate page buffers that store dirty pages having logical block addresses mapped by a single branch of a mapping tree, thus providing improved flush operation performance while also preserving the time ordering in which dirty pages are persisted to the buffer pool within the temporally ordered page descriptor ring. In another example, because all of the page buffers indicated by the non-sequential page descriptors in the work-set are available for re-use immediately after completion of the flush operation, there is no delay in the availability of those page buffers to store more dirty pages. In this way, the disclosed technology advantageously avoids the need to perform one or more subsequent additional flush operations that advance the tail of the descriptor ring past the last one of the page descriptors in the work-set, as was required in previous technologies in order for all the page buffers indicated by the page descriptors in the work-set to be made available for re-use.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed upon illustrating the principles of the disclosed technology.

FIG. 14 is a flow chart of steps performed in some embodiments.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

Embodiments of the technology disclosed herein may provide improvements over previous technologies by performing a flush operation that flushes dirty pages from page buffers indicated by a work-set of non-sequential page descriptors contained in a temporally ordered page descriptor ring. All the page buffers indicated by the page descriptors in the work-set may be available for re-use after completion of the flushing operation.

Dirty pages of user data are received and cached by a data storage system and persistently stored to page buffers that are i) allocated from a page buffer pool, and ii) indicated by page descriptors that are stored at a head of a temporally ordered page descriptor ring as the dirty pages are stored to the page buffers. The flush operation is performed by selecting a work-set consisting of non-sequential page descriptors within the page descriptor ring, flushing the dirty pages from page buffers indicated by the page descriptors in the work-set to non-volatile data storage drives of the data storage system, and storing, for each one of the page buffers indicated by the page descriptors in the work-set, an indication that the page buffer is available for re-use.

Figure 1:
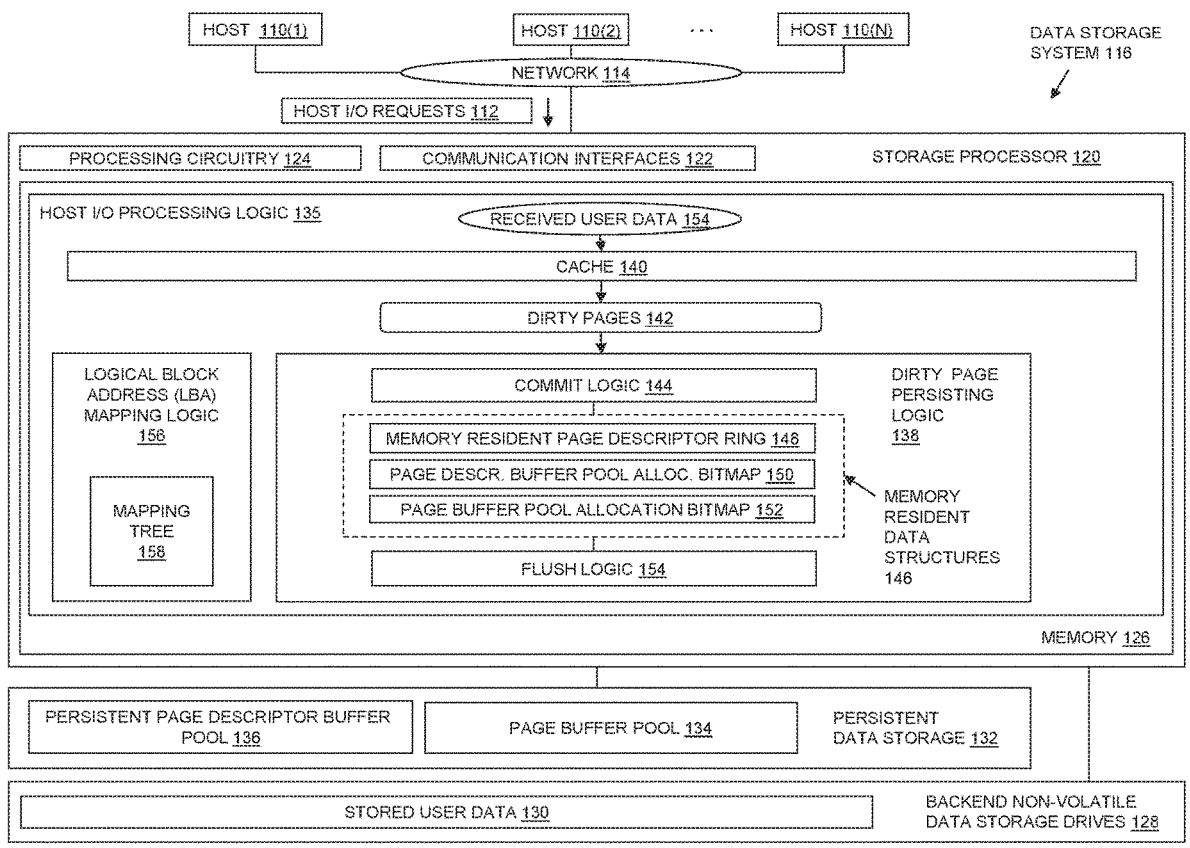
FIG. 1 is a block diagram showing an example of a data storage system in which an example of the disclosed technology is embodied.

FIG. 1 is a block diagram showing an operational environment for the disclosed technology, including an example of a data storage system in which the disclosed technology is embodied. FIG. 1 includes some number of physical and/or virtual Host Computing Devices 110, referred to as "hosts" and shown for purposes of illustration by Hosts 110(1) through 110(N). The hosts access data storage provided by Data Storage System 116, for example over one or more networks, such as a local area network (LAN), and/or a wide area network (WAN) such as the Internet, etc., and shown for purposes of illustration in FIG. 1 by Network 114. Data Storage System 116 includes at least one Storage Processor 120 that is communicably coupled to Network 114, Persistent Data Storage 132, and Backend Non-Volatile Data Storage Drives 128, e.g. though one or more Communication Interfaces 122. No particular hardware configuration is required, and Storage Processor 120 may be embodied as any specific type of device that is capable of processing host input/output (I/O) requests received from Hosts 110 (e.g. I/O read and I/O write requests, etc.) and persistently storing data received from the Hosts 110.

The Backend Non-Volatile Data Storage Drives 128 may include physical data storage drives such as solid state drives, magnetic disk drives, hybrid drives, optical drives, and/or other specific types of drives. Backend Non-Volatile Data Storage Drives 128 may be directly physically connected to and/or contained within Storage Processor 120, and/or may be communicably connected to Storage Processor 120 by way of one or more networks.

Persistent Data Storage 132 may include one or more persistent physical data storage devices that are physically separate and independent from Backend Non-Volatile Data Storage Drives 128. Persistent Data Storage 132 may include one or more persistent data storage devices such as a battery-backed memory (e.g. a battery-backed RAM (Random Access Memory)) that is contained in and/or communicably coupled to Storage Processor 120, and/or some other specific type of persistent data storage. The contents of Persistent Data Storage 132 is preserved when power to Data Storage System 116 is shut off. In some embodiments, the total data storage capacity of Persistent Data Storage 132 may be less than the total data storage capacity of Backend Non-Volatile Data Storage Drives 128.

A Memory 126 in Storage Processor 120 stores program code that is executable on Processing Circuitry 124. Memory 126 may include volatile memory, e.g. DRAM. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, Memory 126 may include software components such as Host I/O Processing Logic 135. When program code in Memory 126 is executed by Processing Circuitry 124, Processing Circuitry 124 is caused to carry out the operations of the software components. Although certain software components are shown in the Figures and described herein for purposes of illustration and explanation, those skilled in the art will recognize that Memory 126 may include various other software components, such as an operating system, various applications, other specific processes, etc.

During operation, pages of user data indicated by write I/O requests in Host I/O Requests 112 are received by Storage Processor 120, as shown by Received User Data 154. Received User Data 154 may initially be stored into a Cache 140, before it is subsequently stored in Backend Non-Volatile Data Storage Drives 128, e.g. as part of Stored User Data 130. Dirty Pages 142 are pages of received user data that are stored in Cache 140, but have not yet been persistently stored, e.g. have not previously been stored into page buffers allocated from Page Buffer Pool 134 and/or flushed to Backend Non-Volatile Data Storage Drives 128. Dirty Pages 142 of user data in Cache 140 are passed to Dirty Page Persisting Logic 138.

For each individual write I/O request in Host I/O Requests 112, after all the pages of user data indicated by that write I/O request have been successfully persisted into page buffers allocated from Page Buffer Pool 134, Storage Processor 120 may indicate successful completion of that write I/O request to the host that issued the write I/O request (e.g. by sending an acknowledgement response message or the like to the host over Network 114), advantageously without first having to perform time consuming accesses to Backend Non-Volatile Data Storage Drives 128. Caching of user data also enables the Storage Processor 120 to promptly service received host I/O read requests directed to pages of user data that are present in Cache 140 without having to access Backend Non-Volatile Data Storage Drives 128.

As each dirty page in Dirty Pages 142 is received by Dirty Page Persisting Logic 138, Commit Logic 144 persistently stores the dirty page into a page buffer that it allocates from Page Buffer Pool 134 to store the dirty page. The Commit Logic 144 uses Memory Resident Data Structures 146 while storing Dirty Pages 142. For example, when each page buffer is allocated from Page Buffer Pool 134 to store a dirty page, a page descriptor is stored at a head of Memory Resident Page Descriptor Ring 148. Page descriptors in Memory Resident Page Descriptor Ring 148 are stored at the head of the Memory Resident Page Descriptor Ring 148 in the same order as the dirty pages are received and stored into the page buffers allocated from Page Buffer Pool 134. Page descriptors stored in Memory Resident Page Descriptor Ring 148 therefore maintain a temporal ordering that is the same as the time order in which the dirty pages indicated by the page descriptors were received and stored by Dirty Page Persisting Logic 138. Accordingly, the order of the valid page descriptors within the Memory Resident Page Descriptor Ring 148, e.g. the order of the page descriptors located from the tail to the head of the Memory Resident Page Descriptor Ring 148, is the order in which dirty pages were stored into the page buffers that are indicated by those page descriptors.

Flush Logic 154 may be embodied as a background process that performs flush operations that move dirty pages of user data from page buffers allocated from Page Buffer Pool 134 to Backend Non-Volatile Data Storage Drives 128, e.g. into Stored User Data 130. The flush operations performed by Flush Logic 154 free up resources (e.g. page buffers in Page Buffer Pool 134, slots in Memory Resident Page Descriptor Ring 148, persistent page descriptor buffers in Persistent Page Descriptor Buffer Pool 136, etc.) for re-use by Dirty Page Persisting Logic 138 when storing newly received dirty pages. The Flush Logic 154 may perform a flush operation by i) selecting a work-set of non-sequential page descriptors within the Memory Resident Page Descriptor Ring 148, ii) flushing the dirty pages stored in the page buffers indicated by the page descriptors in the work-set to the Backend Non-Volatile Data Storage Drives 128 (e.g. into Stored User Data 13), and iii) storing, for each one of the page buffers indicated by the page descriptors in the work-set, an indication that the page buffer is now available for re-use.

In some embodiments, Flush Logic 154 may select the work-set such that, at the beginning of the flush operation, a first one of the page descriptors in the work-set (i.e. the page descriptor with the lowest index in the work-set) is the page descriptor indicated by a tail of Memory Resident Page Descriptor Ring 148 prior to performing the flush operation. In such embodiments, Flush Logic 154 may perform the flush operation at least in part by i) updating (e.g. advancing) the tail of the page descriptor ring to indicate the next page descriptor in Memory Resident Page Descriptor Ring 148 that is not contained in the work-set, and is located after the page descriptor in the work-set that was indicated by the tail of Memory Resident Page Descriptor Ring 148 prior to performing the flush operation, ii) generating a tail marker that stores a) the updated tail of the page descriptor ring and b) the location within Memory Resident Page Descriptor Ring 148 of each page descriptor in the work-set processed by the flush operation that is located above the updated tail (i.e. that has an index higher than the updated tail) of the Memory Resident Page Descriptor Ring 148, and iii) storing the tail marker at the head of Memory Resident Page Descriptor Ring 148.

As shown in the example of FIG. 1, Commit Logic 144 may allocate page buffers to store received dirty pages from a Page Buffer Pool 134 that is located in Persistent Data Storage 132. As noted above, Persistent Data Storage 132 may be separate and independent from the Backend Non-Volatile Data Storage Drives 128. As further shown in the example of FIG. 1, Memory Resident Page Descriptor Ring 148 may be located in the Memory 126 of Storage Processor 120, and Memory 126 may be separate and independent from both Persistent Data Storage 132 and Backend Non-Volatile Data Storage Drives 128.

In some embodiments, each dirty page in Dirty Pages 142 may have a logical address, e.g. a logical block address (LBA). Logical Block Address Mapping Logic 156 may be used by Host I/O Processing Logic 135 to translate the LBAs of individual dirty pages to locations of corresponding physical pages of non-volatile data storage in Backend Non-Volatile Data Storage Drives 128 that are used to store the dirty pages, e.g. within Stored User Data 130.

Logical Block Address Mapping Logic 156 may include one or more mapping trees such as Mapping Tree 158. Logical Block Address Mapping Logic 156 traverses Mapping Tree 158 to translate the LBA of each dirty page to a corresponding physical page in Backend Non-Volatile Data Storage Drives that is used to store that dirty page. The Mapping Tree 158 is a tree structure including multiple levels of nodes, with each node at a given level mapping a range of LBAs corresponding to that level, and containing pointers to nodes in a next lower level. Nodes at lower levels of Mapping Tree 158 map smaller ranges of LBAs. Mapping Tree 158 may terminate with a physical block layer containing physical blocks made up of the specific physical pages used to store dirty pages with corresponding LBAs. Flush Logic 154 may select the work-set of non-sequential page descriptors within Memory Resident Page Descriptor Ring 148 at least in part by selecting a set of page descriptors that includes the page descriptor indicated by the tail prior to performing the flush operation, and that also includes one or more other page descriptors indicating page buffers that store dirty pages having LBAs that are mapped by the same branch (e.g. a single subtree) of Mapping Tree 158 that maps the LBA of the dirty page stored in the page buffer indicated by the page descriptor indicated by the tail prior to performing the flush operation.

In some embodiments, Commit Logic 144 and Flush Logic 154 may maintain, for Page Buffer Pool 134, a page buffer allocation bit map, shown for purposes of illustration by Page Buffer Pool Allocation Bitmap 152. Page Buffer Pool Allocation Bit Map 152 may have a bit corresponding to each page buffer in Page Buffer Pool 134. The bit for each given one of the page buffers indicates whether that page buffer is currently available to store a dirty page, e.g. a first bit value (e.g. 0) indicates that the corresponding page buffer is available for allocation to store a new dirty page, and a second bit value (e.g. 1) indicates that the corresponding page buffer is currently allocated and therefore unavailable to store a new dirty page. For example, Flush Logic 154 may store the indication, for each one of the page buffers indicated by the page descriptors in the work-set processed by a flush operation, that the page buffer is available for re-use after completion of the flush operation by modifying the bit corresponding to the page buffer in the Page Buffer Pool Allocation Bit Map 152 to indicate that the page buffer is currently available to store a dirty page, e.g. by clearing the corresponding bit. Commit Logic 144 may store an indication, for each one of the page buffers that is allocates to store a dirty page, that the page buffer is unavailable to store another dirty page, e.g. by setting the corresponding bit in the Page Buffer Pool Allocation Bit Map 152.

In some embodiments, a Persistent Page Descriptor Buffer Pool 136 may be maintained in the Persistent Data Storage 132. The Persistent Page Descriptor Buffer Pool 136 contains multiple persistent page descriptor buffers. The persistent page descriptor buffers in Persistent Page Descriptor Buffer Pool 136 are allocated (e.g. by Commit Logic 144) to store persistent copies of valid page descriptors in Memory Resident Page Descriptor Ring 148. For example, persistent page descriptor buffers may be allocated to store copies of each page descriptor in Memory Resident Page Descriptor Ring 148 that currently indicates a page buffer allocated from Page Buffer Pool 134 and storing a dirty page not yet flushed to Backend Non-Volatile Data Storage Drives 128. Persistent page descriptor buffers allocated from Persistent Page Descriptor Buffer Pool 136 may be used when Storage Processor 120 boots up, in order to re-create the Memory Resident Page Descriptor Ring 148 in the state it was in prior to power being shut off. As Commit Logic 144 stores each new page descriptor at the head of the Memory Resident Page Descriptor Ring 148, it also allocates a corresponding persistent page descriptor buffer from Persistent Page Descriptor Pool 136, and stores a copy of the page descriptor being added to Memory Resident Page Descriptor Ring 148 in the corresponding persistent page descriptor buffer allocated from Persistent Page Descriptor Buffer Pool 136.

The Memory Resident Page Descriptor Ring 148 may be overprovisioned with respect to the total number of persistent page descriptor buffers contained in the Persistent Page Descriptor Pool 136. For example, in some embodiments, the Memory Resident Page Descriptor Ring 148 may include a total number of slots (each of which can store a single page descriptor), that is ten times as many as the total number of persistent page descriptor buffers (each of which can store a copy of a single page descriptor) contained in the Persistent Page Descriptor Buffer Pool 136. In this way, the Memory Resident Page Descriptor Ring 148 may have a total capacity (e.g. a total number of page descriptor slots) that exceeds the total capacity (e.g. the total number of persistent page descriptor buffers) of the Persistent Page Descriptor Buffer Pool 136.

In some embodiments, Commit Logic 144 and Flush Logic 154 may maintain, for Persistent Page Descriptor Buffer Pool 136, a page descriptor buffer pool allocation bit map, shown for purposes of illustration by Page Descriptor Buffer Pool Allocation Bitmap 150. Page Descriptor Buffer Pool Allocation Bit Map 150 may have a bit corresponding to each persistent page descriptor buffer in Persistent Page Descriptor Buffer Pool 136. The bit for each persistent page descriptor buffer indicates whether that persistent page descriptor buffer is currently available to store a copy of a page descriptor in Memory Resident Page Descriptor Ring 148, e.g. a first bit value (e.g. 0) indicates that the corresponding persistent page descriptor buffer is available to store a copy of a page descriptor in Memory Resident Page Descriptor Ring 148, and a second bit value (e.g. 1) indicates that the corresponding persistent page descriptor buffer is currently allocated and therefore unavailable to store a copy of another page descriptor in Memory Resident Page Descriptor Ring 148. For example, Flush Logic 154 may store an indication, for each one of the persistent page descriptor buffers storing a copy of a page descriptor contained in the work-set processed by a flush operation, that the persistent page descriptor buffer is available for re-use after completion of the flush operation by modifying the bit corresponding to the persistent page descriptor buffer in the Page Descriptor Pool Allocation Bit Map 150 to indicate that the persistent page descriptor buffer is currently available to store a copy of one of the page descriptors in Memory Resident Page Descriptor Ring 148, e.g. by clearing the corresponding bit. The Commit Logic 144 may store an indication, for each one of the persistent page descriptor buffers allocated from Persistent Page Descriptor Buffer Pool 136 to store a copy of a page descriptor added to Memory Resident Page Descriptor Ring 148, that the persistent page descriptor buffer is unavailable to store a copy of another page descriptor from Memory Resident Page Descriptor Ring 148, e.g. by setting the corresponding bit in the Page Descriptor Buffer Pool Allocation Bit Map 150.

Figure 2:
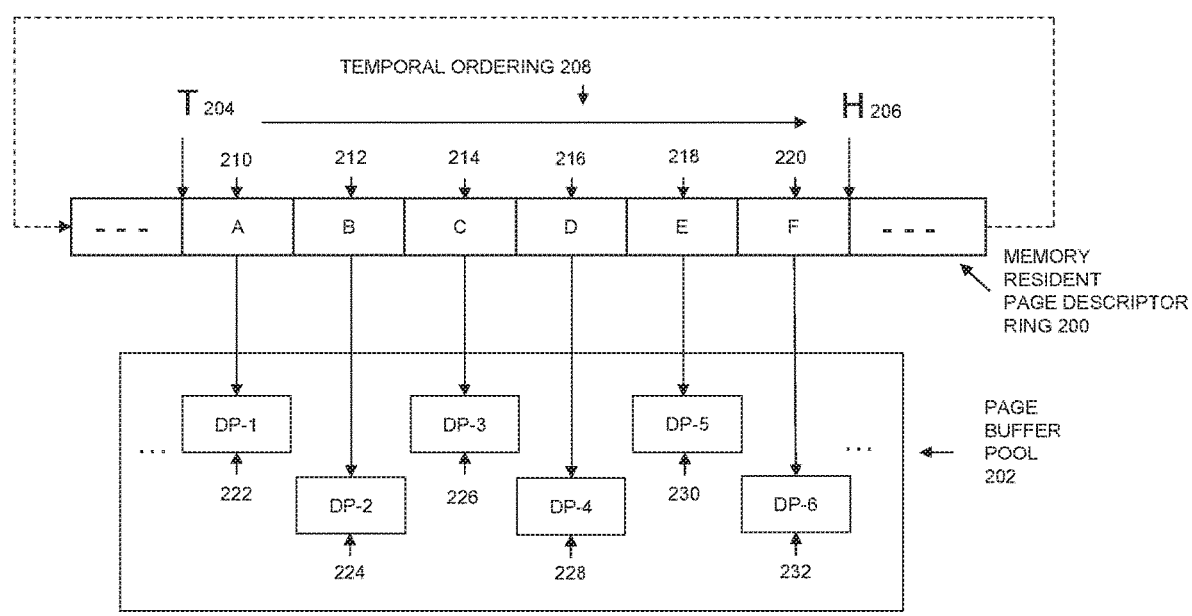
FIG. 2 is a block diagram showing an example of a memory resident page descriptor ring and a page buffer pool in some embodiments.

FIG. 2 is a block diagram showing an example of a Memory Resident Page Descriptor Ring 200 and a Page Buffer Pool 202. As shown in FIG. 2, Memory Resident Page Descriptor Ring 200 is a circular data structure made up of page descriptors. The slots in Memory Resident Page Descriptor Ring 200 that are currently available to store page descriptors begin with the slot indicated by head H 206 and extend through the slot just before the slot indicated by tail T 204. Commit Logic 144 stores each new page descriptor into an available slot indicated by the current head H 206, and then moves head H 206 forward to the next slot. The index of each newly stored page descriptor is generated by incrementing the index of the last previously stored page descriptor. In this way, the page descriptors stored in Memory Resident Page Descriptor Ring 200 have continuously increasing indexes, and later stored page descriptors have relatively higher indexes than earlier stored page descriptors. The actual offset of the slot that stores a page descriptor within Memory Resident Page Descriptor Ring 200, e.g. relative to a position of a predetermined initial slot, may, for example, be calculated as the index of the page descriptor modulo the total number of slots in Memory Resident Page Descriptor Ring 200.

In the example of FIG. 2, the page descriptors A through F are currently valid, and are stored in the slots from tail T 204 up to the head H 206, e.g. slots 210, 212, 214, 216, 218, and 220. Each one of the valid page descriptors indicates (e.g. includes a pointer to) a page buffer located in and allocated from Page Buffer Pool 202 that currently stores a dirty page that has not yet been flushed to the Backend Non-Volatile Data Storage Drives 128. In the example of FIG. 2, page descriptor A in slot 210 includes a pointer to page buffer 222, which stores dirty page DP-1, page descriptor B in slot 212 includes a pointer to page buffer 224, which stores dirty page DP-2, page descriptor C in slot 214 includes a pointer to page buffer 226, which stores dirty page DP-3, page descriptor D in slot 216 includes a pointer to page buffer 228, which stores dirty page DP-4, page descriptor E in slot 218 includes a pointer to page buffer 230, which stores dirty page DP-5, and page descriptor F in slot 220 includes a pointer to page buffer 232, which stores dirty page DP-6. The Temporal Ordering 208 of the valid page descriptors in Memory Resident Page Descriptor Ring 200 represents the time order in which dirty pages were received and stored in the corresponding page buffers. Accordingly, in the example of FIG. 2, the Temporal Ordering 208 of Memory Resident Page Descriptor Ring 200 indicates that the order in which dirty pages were received and stored is DP-1, DP-2, DP-3, DP-4, DP-5, DP-6.

Figure 3:
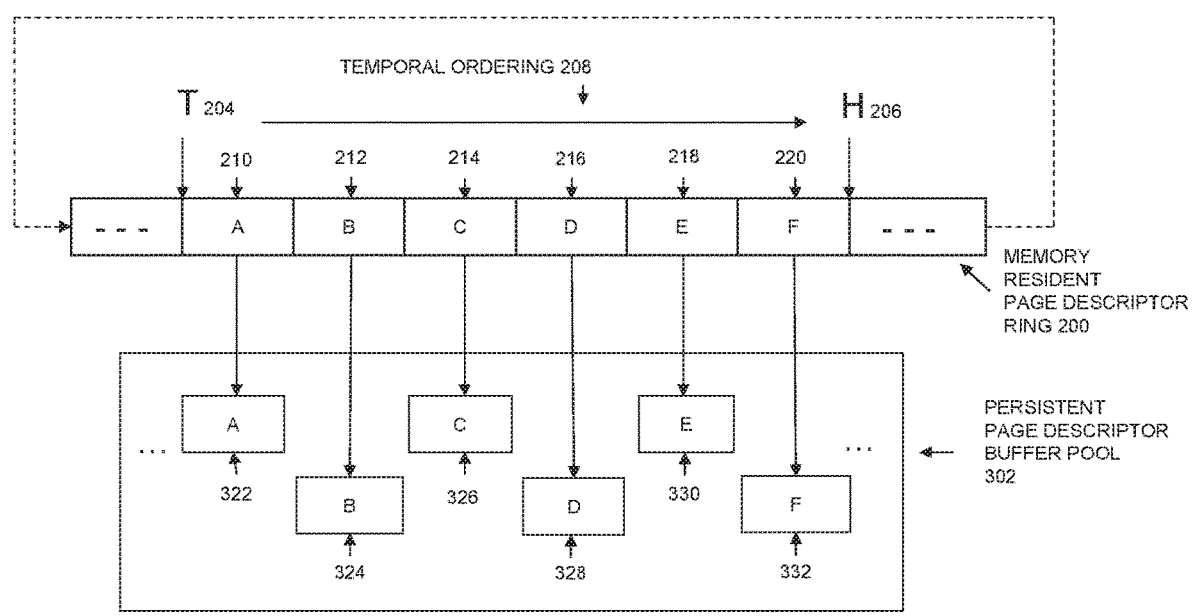
FIG. 3 is a block diagram showing an example of a memory resident page descriptor ring and a persistent page descriptor buffer pool in some embodiments.

FIG. 3 is a block diagram showing the example of Memory Resident Page Descriptor Ring 200 from FIG. 2, and also showing persistent page descriptor buffers allocated from Persistent Page Descriptor Buffer Pool 302 that store copies of the valid page descriptors contained in the Memory Resident Page Descriptor Ring 200. In the example of FIG. 3, persistent page descriptor buffer 322 stores a copy of page descriptor A, persistent page descriptor buffer 324 stores a copy of page descriptor B, persistent page descriptor buffer 326 stores a copy of page descriptor C, persistent page descriptor buffer 328 stores a copy of page descriptor D, persistent page descriptor buffer 330 stores a copy of page descriptor E, and persistent page descriptor 332 stores a copy of page descriptor F. When Storage Processor 120 boots, the allocated persistent page descriptor buffers from Persistent Page Descriptor Buffer Pool 302 that store copies of valid page descriptors that were contained in the memory resident page descriptor ring prior to power being shut off are used by Host I/O Processing Logic 135 to restore the memory resident page descriptor ring to the state it was in prior to power being shut off.

Figure 4:
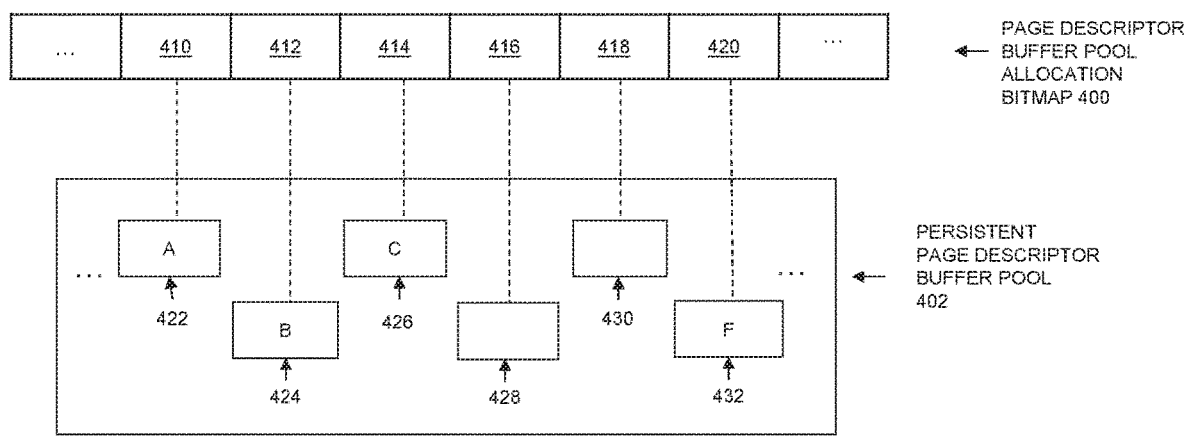
FIG. 4 is a block diagram showing an example of a page descriptor buffer pool allocation bitmap and a persistent page descriptor buffer pool in some embodiments.

FIG. 4 is a block diagram showing an example of a Page Descriptor Buffer Pool Allocation Bitmap 400 with a Persistent Page Descriptor Buffer Pool 402. As shown in FIG. 4, the bits 410, 412, 414, 416, 418, and 420 in Page Descriptor Buffer Pool Allocation Bitmap 400 correspond to the persistent page descriptor buffers 422, 424, 426, 428, 430, and 432 in Persistent Page Descriptor Pool 402. In the example of FIG. 4, since persistent page descriptor buffers 422, 424, 426, and 432 are each currently allocated and store copies of persistent pages contained in the memory resident page descriptor ring, bits 410, 412, 414, and 420 each have a current bit value (e.g. 1) indicating that the corresponding persistent page descriptor buffer is currently allocated, and currently stores a copy of a page descriptor that is contained in the memory resident page descriptor ring, and is therefore currently unavailable to store a copy of another page descriptor that is contained in the memory resident page descriptor ring. Since persistent page descriptor buffers 428 and 430 are each currently unallocated and available to persistently store copies of page descriptors in the memory resident page descriptor ring, bits 416 and 418 each have a current bit value (e.g. 0) indicating that the corresponding persistent page descriptor buffer is currently unallocated and available to store a copy of one of the page descriptors contained in the memory resident page descriptor ring.

Figure 5:
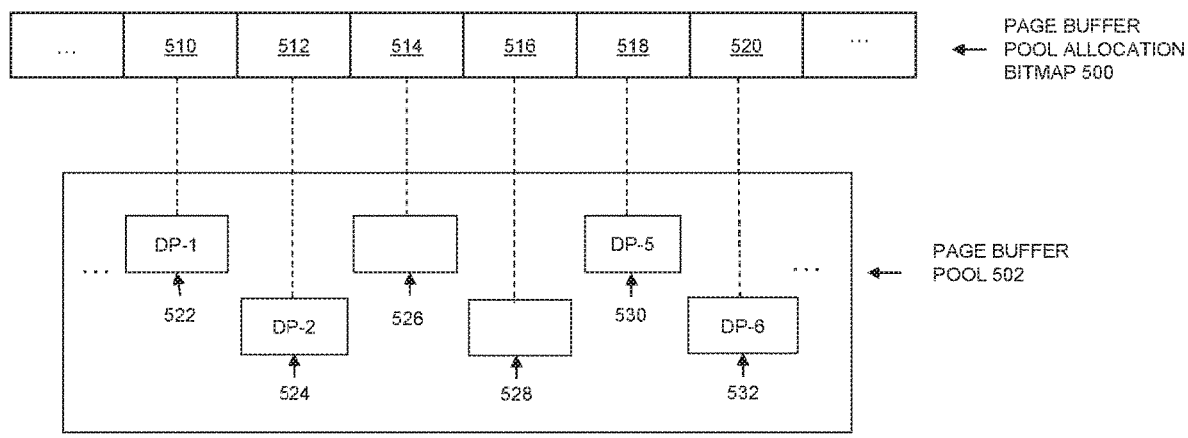
FIG. 5 is a block diagram showing an example of a page buffer pool allocation bitmap and a page buffer pool in some embodiments.

FIG. 5 is a block diagram showing an example of a Page Buffer Pool Allocation Bitmap 500 with a Page Buffer Pool 502. As shown in FIG. 5, the bits 510, 512, 514, 516, 518, and 520 in Page Buffer Pool Allocation Bitmap 500 correspond to the page buffers 522, 524, 526, 528, 530, and 532 in Page Buffer Pool 502. Since page buffers 522, 524, 530, and 532 are each currently allocated and store dirty pages of user data, bits 510, 512, 518, and 520 each have a current bit value (e.g. 1) indicating that the corresponding page buffer is currently allocated, and currently stores a dirty page of user data that has not been flushed, and is therefore currently unavailable to store another dirty page of user data. Since page buffers 526 and 528 are each currently unallocated, and available to store dirty pages of user data, bits 514 and 516 each have a current bit value (e.g. 0) indicating that the corresponding page buffer is currently unallocated, and available to store a dirty page of user data that has not been flushed.

Figure 6:
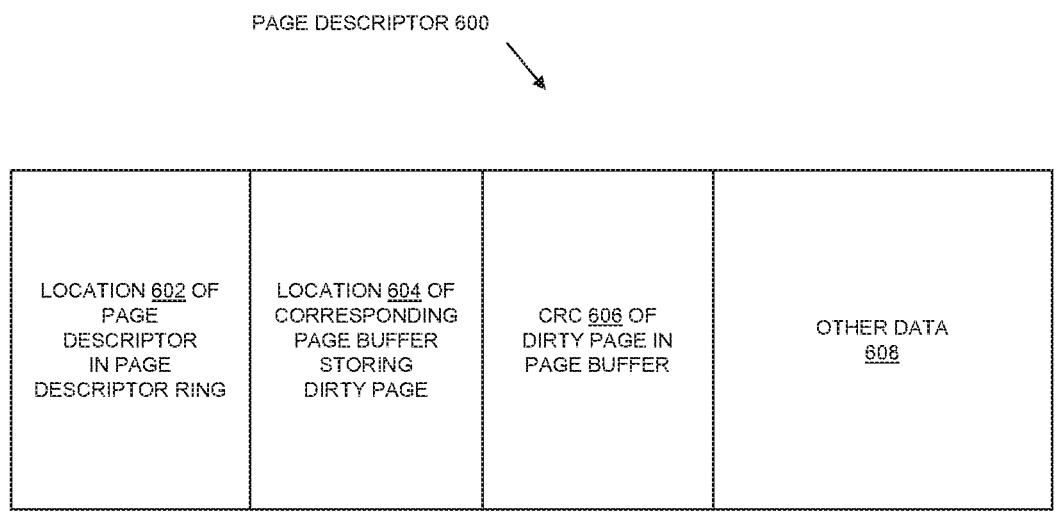
FIG. 6 is a block diagram showing an example of contents of a page descriptor in some embodiments.

FIG. 6 is a block diagram showing an example of contents of a Page Descriptor 600 in some embodiments. In the example of FIG. 6, Page Descriptor 600 includes a Location 602 of Page Descriptor 600 in the page descriptor ring. Location 602 of Page Descriptor 600 in the page descriptor ring may, for example, consist of or include an index or offset of Page Descriptor 600 within the memory resident page descriptor ring, e.g. within Memory Resident Page Descriptor Ring 148. The Location 602 stored in the persistent copy of Page Descriptor 600 may be used when Storage Processor 120 boots up, in order to place Page Descriptor 600 at the correct location within the re-created Memory Resident Page Descriptor Ring 148.

Page Descriptor 600 may also include a Location 604 of a corresponding page buffer storing a dirty page, e.g. a pointer to a page buffer allocated from Page Buffer Pool 134.

Page Descriptor 600 may also include a CRC (Cyclic Redundancy Code) 606 generated from the dirty page stored in the page buffer indicated by Location 604, and used to validate the data stored in the buffer indicated by Location 604.

Various other types of data may also be stored in the Page Descriptor 600, as shown in FIG. 6 by Other Data 608.

Figure 7:
FIG. 7 is a block diagram showing an example of contents of a tail marker in some embodiments.

FIG. 7 is a block diagram showing an example of contents of a Tail Marker 700 in some embodiments. In the example of FIG. 7, Tail Marker 700 includes a Location 702 of Tail Marker 700 in the page descriptor ring. Location 702 of Tail Marker 700 in the page descriptor ring may, for example, consist of or include an index or offset of Tail Marker 700 within the memory resident page descriptor ring, e.g. within Memory Resident Page Descriptor Ring 148. The Location 702 stored in a persistent copy of Tail Marker 700 that is stored in Persistent Page Descriptor Pool 136 may be used when Storage Processor 120 boots up, in order to place Tail Marker 700 in the correct location within the re-created Memory Resident Page Descriptor Ring 148.

Tail Marker 700 may also include Locations 704 in the page descriptor ring of all page descriptors that were processed in the last completed flush operation and that are located above the tail after it was updated at the completion of the last flush operation. Those skilled in the art will recognize that the tail after it was updated at the completion of the last flush operation may also be considered the current tail of the page descriptor ring when the Tail Marker 700 is subsequently read. For example, Locations 704 may include an index or offset of each page descriptor that was one of the page descriptors in the work-set that was processed by the last completed flush operation, and that is also located above the current tail of the page descriptor ring.

In some embodiments, it may be desirable for the Tail Marker 700 to be limited in size, e.g. in order for the Tail Marker 700 to have the same size as a page descriptor, so that it can be stored into a slot of the memory resident page descriptor ring. In the case where large numbers of page descriptors are stored in the memory resident page descriptor ring, the size of the page descriptor index may become large. In some cases, the total number of page descriptors in the work-set processed in the last completed flush operation and also located above the current tail of the page descriptor ring may also be large. It may accordingly be desirable to encode the locations of the previously processed page descriptors stored in Locations 704 in a manner that avoids storing large numbers of large indexes. In some embodiments, for example, Locations 704 may be encoded using relatively smaller offsets that are each relative to the start of one of a number of predetermined segments within the page descriptor ring. For example, such relatively smaller offsets that may be used to describe the locations of the page descriptors in the work-set processed in the last completed flush operation and located above the current tail in Locations 704 may be intra-segment offsets describing relative distances from the starting positions of four discrete equal sized segments of slots within the page descriptor ring. To provide such an efficient encoding, a first array may be defined having four elements, with each element corresponding to one of the segments. The value of each element in the first array may be used to store the total number of page descriptors in the work-set processed by the last completed flush operation that are above the current tail and that are located within the corresponding segment of page descriptor ring. A second array may then be used to store all of the intra-segment offsets of the page descriptors in the work-set processed by the last completed flush operation that are above the current tail. For example, the intra-segment offsets of page descriptors in the work-set processed by the last completed flush operation that are above the current tail may be stored within the second array in increasing order, with the intra-segment offsets of those page descriptors located within the first segment at the beginning of the second array, the intra-segment offsets of those page descriptors located within the second segment following the intra-segment offsets of those page descriptors located within the first segment, the intra-segment offsets of those page descriptors located within the third segment following the intra-segment offsets of those page descriptors located within the second segment, and the intra-segment offsets of those page descriptors located within the fourth segment following the intra-segment offsets of those page descriptors located within the third segment.

Tail Marker 700 may also include a Location 706 in the page descriptor ring of the tail after it was updated at the completion of the last flush operation. As noted above, the Location 706 of the tail after it was updated at the completion of the last flush operation may also be considered the location of the current tail of the page descriptor ring. For example, Location 706 may include an index or offset of the tail within the memory resident page descriptor ring after completion of the last flush operation that was previously performed.

Various other types of data may also be stored in the Tail Marker 700, as shown in FIG. 7 by Other Data 708.

Figure 8:
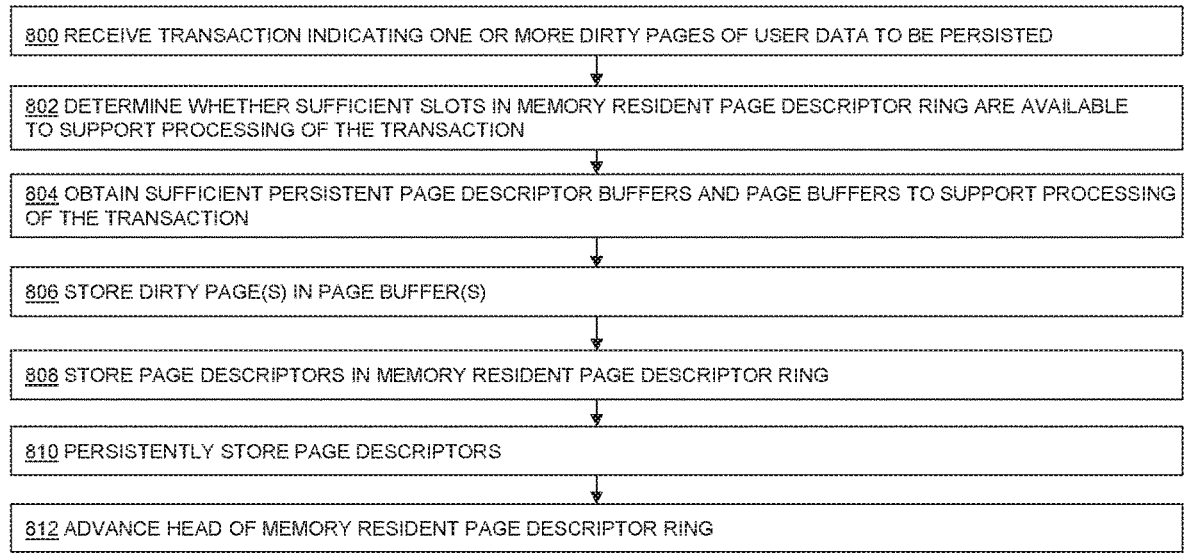
FIG. 8 is a flow chart showing an example of steps that may be performed to store dirty pages of cached user data to page buffers that are allocated from a page buffer pool and indicated by page descriptors in a page descriptor ring in some embodiments.

FIG. 8 is a flow chart showing an example of steps that may be performed in some embodiments to store dirty pages of cached user data to page buffers that are allocated from a page buffer pool and indicated by page descriptors in a page descriptor ring in some embodiments.

At step 800, a transaction is received indicating one or more dirty pages of cached user data that are to be persisted.

At step 802, the disclosed technology determines whether sufficient unallocated slots are present in the memory resident page descriptor ring (e.g. Memory Resident Page Descriptor Ring 148) to support processing of the transaction. For example, at step 802 the disclosed technology may determine whether the number of slots available to store dirty pages at the head of the memory resident page descriptor ring is equal to or greater than the number of dirty pages indicated by the transaction received at step 800. For example, the total number of slots available for allocation in the page descriptor ring may consist of those slots extending from the current head to the current tail of the page descriptor ring. In the event that there are fewer slots available to store dirty pages at the head of the memory resident page descriptor ring than are necessary to support processing of the transaction, processing of the transaction may be paused until sufficient slots are available to support processing of the transaction, e.g. as a result of completion of one or more flush operations.

At step 804, the disclosed technology obtains sufficient persistent page descriptor buffers to support processing of the transaction. For example, at step 804 the disclosed technology may allocate a number of persistent page descriptor buffers from Persistent Page Descriptor Buffer Pool 136 that is equal to the number of dirty pages indicated by the transaction received at step 800. Also at step 804, the disclosed technology may set the bits in the Page Descriptor Buffer Pool Allocation Bitmap 150 that correspond to the persistent page descriptor buffers allocated at step 804. In the event that there are insufficient persistent page descriptor buffers available for allocation in the Persistent Page Descriptor Buffer Pool 136 to support processing of the transaction (e.g. the number of clear bits in Page Descriptor Buffer Pool Allocation Bitmap 150 is less than the number of dirty pages indicated by the transaction), processing of the transaction may be paused until sufficient persistent page descriptor buffers are available to support processing of the transaction, e.g. as a result of completion of one or more subsequent flush operations.

Further at step 804, the disclosed technology may obtain sufficient page buffers to support processing of the transaction. For example, at step 804 the disclosed technology may allocate a number of page buffers from Page Buffer Pool 134 that is equal to the number of dirty pages indicated by the transaction received at step 800. Also at step 804, the disclosed technology may set the bits in the Page Buffer Pool Allocation Bitmap 152 corresponding to the page buffers allocated at step 804. In the event that there are insufficient page buffers available for allocation at the head of the memory resident page descriptor ring to support processing of the transaction (e.g. the number of clear bits in Page Buffer Pool Allocation Bitmap 152 is less than the number of dirty pages indicated by the transaction), processing of the transaction may be paused until sufficient page buffers are available to support processing of the transaction, e.g. as a result of completion of one or more subsequent flush operations.

At step 806, the disclosed technology stores the dirty pages indicated by the transaction received at step 800 into the page buffers allocated at step 804.

At step 808, the disclosed technology stores page descriptors for the transaction at the head of the memory resident page descriptor ring, e.g. by storing a page descriptor for each dirty page indicated by the transaction to the memory resident page descriptor ring into a slot at the head of the memory resident page descriptor ring, the stored page descriptor including a pointer to the page buffer storing the dirty page and a CRC calculated for the dirty page.

At step 810, the disclosed technology persistently stores copies of the page descriptors that were stored for the transaction in the memory resident page descriptor ring for the transaction in the memory resident page descriptor ring in step 808, e.g. by persistently storing copies of those page descriptors into the persistent page descriptor buffers allocated for the transaction at step 804.

At step 812 the disclosed technology advances the head of the memory resident page descriptor ring to indicate the next slot after the last slot used to store a page descriptor within the memory resident page descriptor ring for the transaction.

Figure 9:
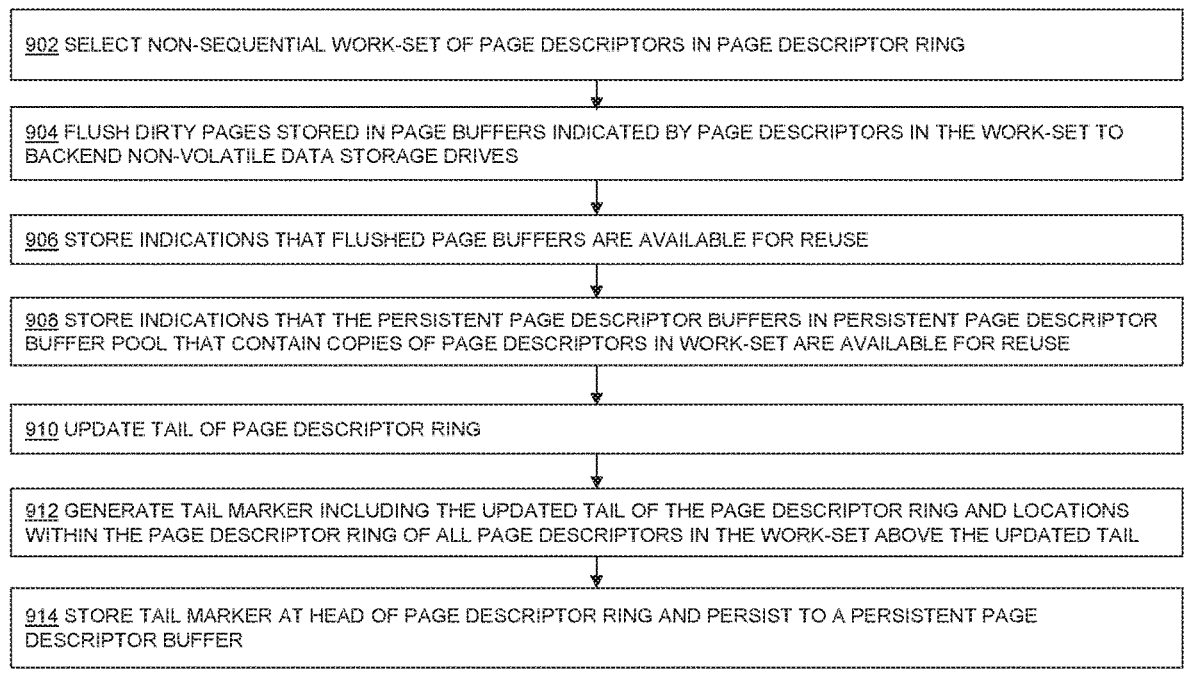
FIG. 9 is a flow chart showing an example of steps that may be performed during a flush operation in some embodiments.

FIG. 9 is a flow chart showing an example of steps that may be performed during a flush operation in some embodiments.

At step 902 the disclosed technology selects a non-sequential work-set of page descriptors in the memory resident page descriptor ring (e.g. Memory Resident Page Descriptor Ring 148). For example, page descriptors in the work-set may consist of a set of page descriptors i) in which all the page descriptors include pointers to page buffers storing dirty pages having LBAs that are translated to corresponding physical blocks by a single branch of a mapping tree (e.g. Mapping Tree 158), and ii) that includes the page descriptor indicated by the current tail of the memory resident page descriptor ring.

At step 904 the disclosed technology flushes the dirty pages stored in page buffers indicated by the page descriptors in the work-set to the backend non-volatile data storage drives. For example, the disclosed technology moves the dirty pages from the page buffers indicated by the page descriptors in the work-set to Stored User Data 130.

At step 906, the disclosed technology stores indications that the page buffers that stored the dirty pages that were flushed to the backend non-volatile data storage drives are available for re-use. For example, the disclosed technology may clear the bits in Page Buffer Pool Allocation Bitmap 152 that correspond to the page buffers that stored the dirty pages that were flushed at step 904.

At step 908, the disclosed technology stores indications that the persistent page descriptor buffers in Persistent Page Descriptor Buffer Pool 136 that store copies of the page descriptors in the work-set are available for re-use. For example, the disclosed technology may clear the bits in Page Descriptor Buffer Pool Allocation Bitmap 150 that correspond to the persistent page buffers in Persistent Page Descriptor Buffer Pool 136 that store copies of the page descriptors in the work-set that was selected at step 902.

At step 910, the disclosed technology updates the tail of the memory resident page descriptor ring. For example, the disclosed technology may update the tail of the memory resident page descriptor ring by advancing the tail of the page descriptor ring to indicate the next slot in Memory Resident Page Descriptor Ring 148 that follows the slot indicated by the tail prior to performing the flush operation and stores a page descriptor that is not contained in the work-set.

At step 912, the disclosed technology generates a tail marker including the updated tail of the memory resident page descriptor ring and the locations within the memory resident page descriptor ring of all page descriptors in the memory resident page descriptor ring that are both i) contained in the work-set selected at step 902, and ii) located above the updated tail of the memory resident page descriptor ring.

At step 914, the disclosed technology stores the tail marker generated at step 912 into a slot within the memory resident page descriptor ring at the head of the memory resident page descriptor ring. Further at step 914, a persistent copy of the tail marker is stored into a persistent page descriptor buffer allocated from the Persistent Page Descriptor Buffer Pool 136.

Figure 10:
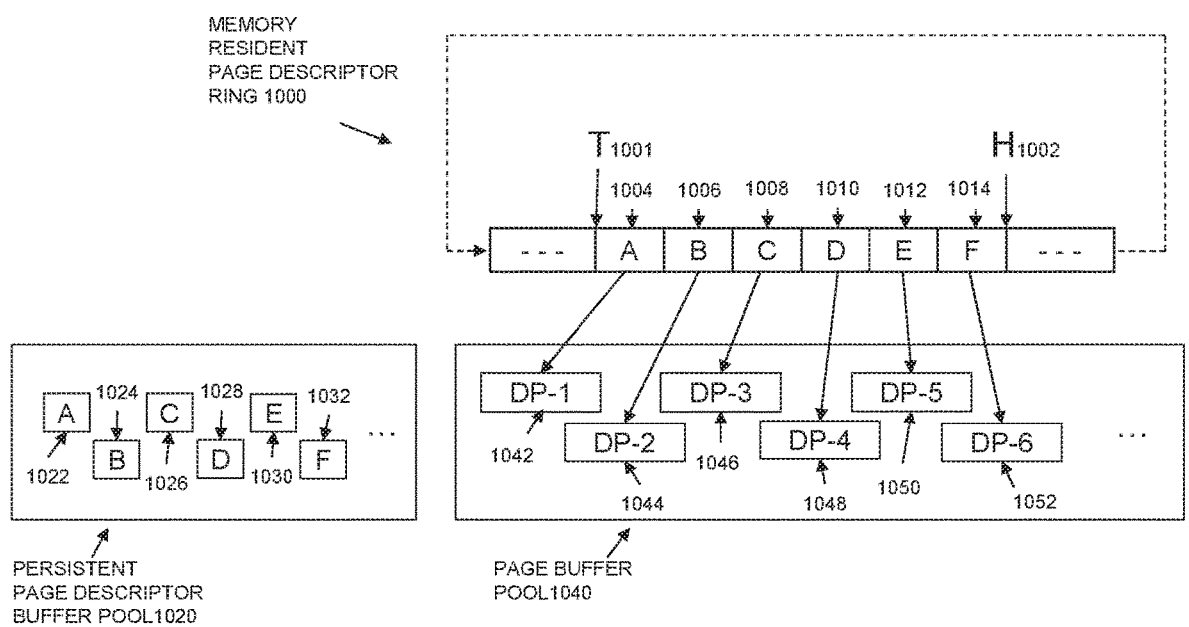
FIG. 10 is a block diagram showing an example of a memory resident page descriptor ring, a persistent page descriptor buffer pool, and a page buffer pool.
Figure 11:
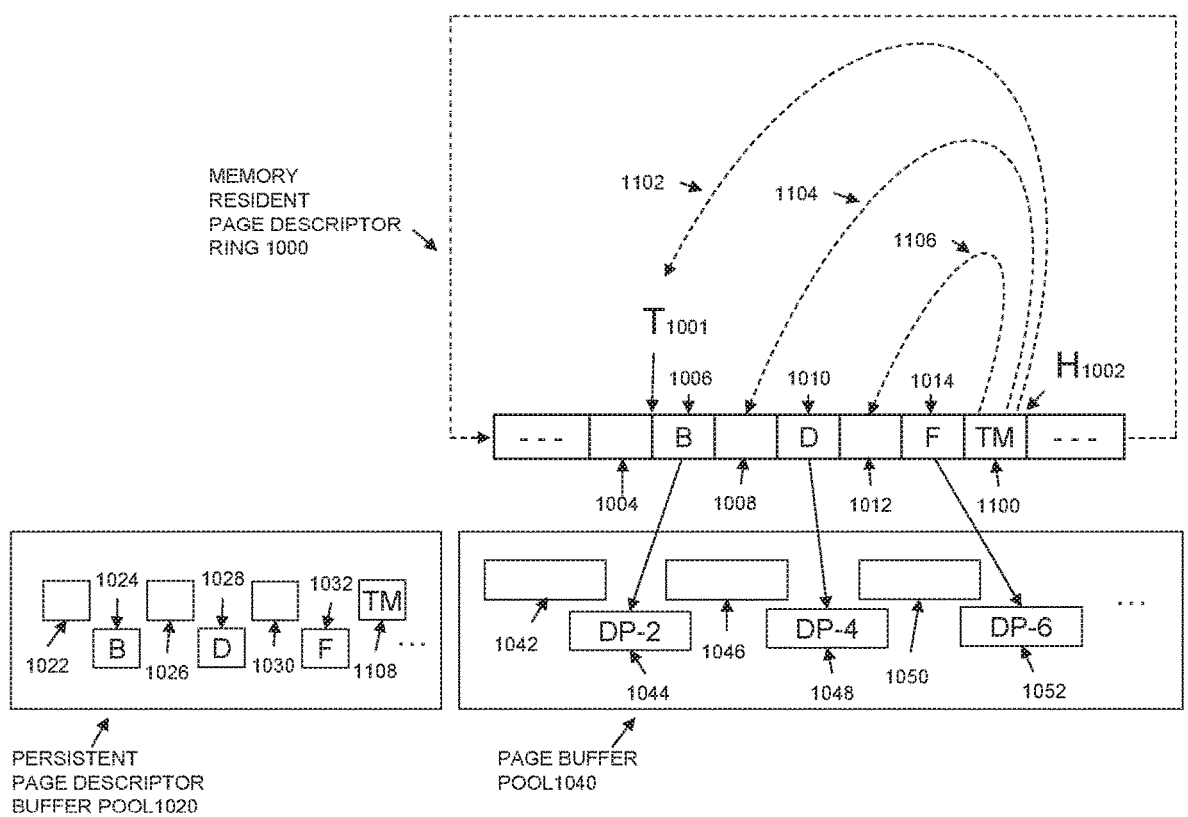
FIG. 11 is a block diagram showing the example of FIG. 10 after a flush operation has been performed.
Figure 12:
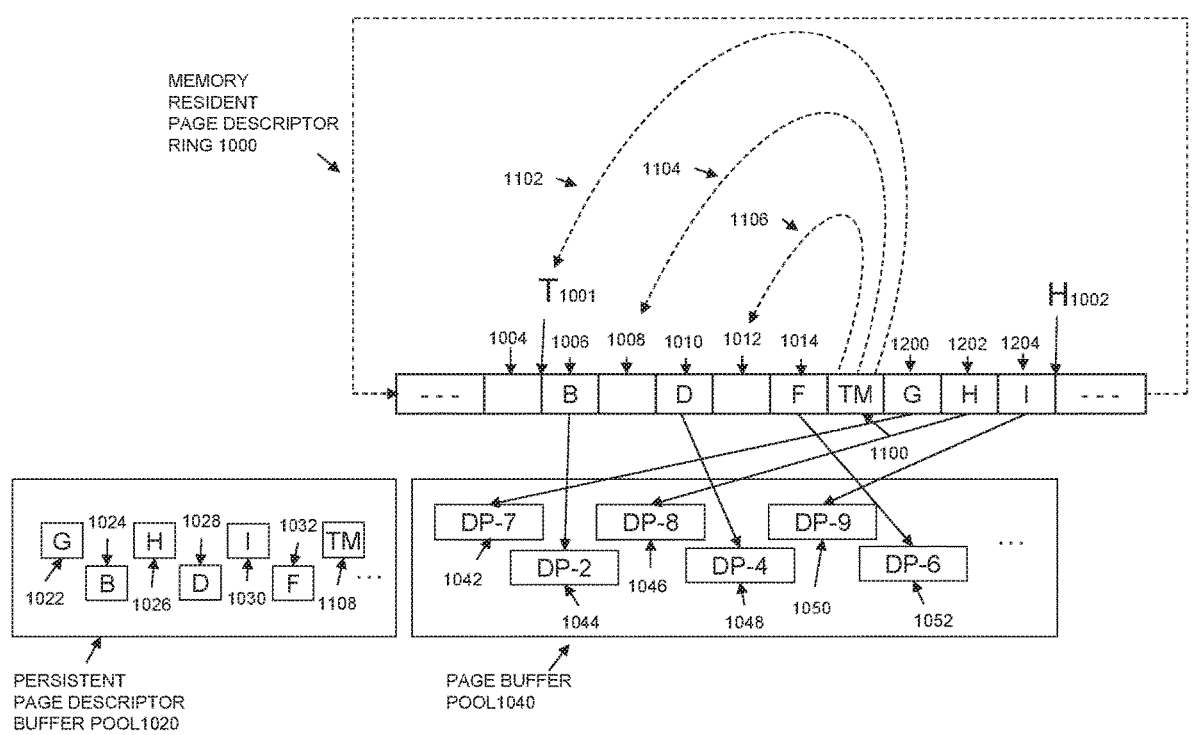
FIG. 12 is a block diagram showing the example of FIG. 11 after additional dirty pages of cached user data have been stored to page buffers allocated from the page buffer pool indicated by page descriptors subsequently added to the memory resident page descriptor ring.

FIGS. 10-12 provide an illustrative example of operation of the disclosed technology in some embodiments. The example of FIG. 10 shows a Memory Resident Page Descriptor Ring 1000, a Persistent Page Descriptor Buffer Pool 1020, and a Page Buffer Pool 1040. As further shown in FIG. 10, the Memory Resident Page Descriptor Ring 1000 has a tail T 1001 and a head H 1002. Between the tail T 1001 and the head H 1002 are slot 1004 storing page descriptor A, slot 1006 storing page descriptor B, slot 1008 storing page descriptor C, slot 1010 storing page descriptor D, slot 1012 storing page descriptor E, and slot 1014 storing page descriptor F.

Page descriptor A includes a pointer to page buffer 1042, which stores dirty page DP-1. Page descriptor B includes a pointer to page buffer 1044, which stores dirty page DP-2. Page descriptor C includes a pointer to page buffer 1046, which stores dirty page DP-3. Page descriptor D includes a pointer to page buffer 1048, which stores dirty page DP-4. Page descriptor E includes a pointer to page buffer 1050, which stores dirty page DP-5. Page descriptor E includes a pointer page buffer 1052, which stores dirty page DP-6.

Persistent page descriptor buffer 1022 stores a copy of page descriptor A, persistent page descriptor buffer 1024 stores a copy of page descriptor B, persistent page descriptor buffer 1026 stores a copy of page descriptor C, persistent page descriptor buffer 1028 stores a copy of page descriptor D, persistent page descriptor buffer 1030 stores a copy of page descriptor E, and persistent page descriptor buffer 1032 stores a copy of page descriptor F.

For example, a flush operation is next performed by the disclosed flush logic starting with the components as shown in FIG. 10. The flush operation is, for example, performed on a work-set consisting of the non-sequential page descriptors A, C, and E. The flush operation completes successfully, and flushes dirty pages DP-1, DP-3, and DP-5 to the backend non-volatile data storage drives. The result of the successfully completed flush operation performed on the work-set consisting of non-sequential page descriptors A, C, and E is shown in FIG. 11.

FIG. 11 is a block diagram showing the example of FIG. 10 after the flush operation has been successfully completed on the work-set consisting of the non-sequential page descriptors A, C, and E. As shown in FIG. 11, the flush operation updated tail T 1001 to indicate the next slot in Memory Resident Page Descriptor Ring 1000 that follows the slot indicated by the tail T 1001 prior to performing the flush operation and that stores a page descriptor that is not contained in the work-set. For example, the tail T 1001 was updated to indicate slot 1006, which is the next slot i) that follows slot 1004 (the slot indicated by tail T 1001 prior to performing the flush operation), and ii) that stores a page descriptor not contained in the work-set (e.g. the page descriptor B, which was not contained in the work-set A, C, E).

As also shown in FIG. 11, the flush operation stored a tail marker TM at the previous location of head H 1002, e.g. slot 1100. The flush operation also stored a persistent copy of the tail marker TM in the persistent page descriptor buffer 1108. The flush operation updated Head H 1002 to indicate the slot immediately following the slot storing tail marker TM. The tail marker TM generated by the flush operation indicates (e.g. includes the index of) the location of the updated tail T 1001, as shown by reference number 1102. The tail marker TM also indicates (e.g. includes the indexes of or encodings of the indexes of) the locations of the page descriptors in the work-set that are located above updated tail T 1001 (e.g. page descriptors C and E stored in slots 1008 and 1012), as shown by reference numbers 1104 and 1106.

As also shown in FIG. 11, after completion of the flush operation on the work-set including page descriptors A, C, and E, those persistent page descriptor buffers 1022, 1026, and 1030 in Persistent Page Descriptor Buffer Pool 1020 that persistently stored copies of page descriptors A, C, and E before the flush operation are available for re-use. Accordingly, the flush operation modified (e.g. cleared) the bits in the page descriptor buffer pool allocation bitmap corresponding to persistent page descriptor buffers 1022, 1026, and 1030 to indicate that persistent page descriptor buffers 1022, 1026, and 1030 are now unallocated and again available to persistently store copies of other page descriptors contained in the Memory Resident Page Descriptor Ring 1000.

As also shown in FIG. 11, also after completion of the flush operation on the work-set including page descriptors A, C, and E, the page buffers 1042, 1046, and 1050 in Page Buffer Pool 1040 that were indicated by pointers contained in the page descriptors A, C, and E are available for re-use. Accordingly, the flush operation modified (e.g. cleared) the bits in the Page Buffer Pool Allocation Bitmap 152 corresponding to page buffers 1042, 1046, and 1050 have been modified (e.g. cleared) to indicate that page buffers 1042, 1046, and 1050 are currently unallocated and available to persistently store newly received dirty pages of user data.

For example, a transaction indicating three dirty pages to be persistently stored is next processed by the disclosed commit logic starting with the components as shown in FIG. 11. For example, transaction indicates the three dirty pages DP-7, DP-8, and DP-9. The transaction completes successfully, resulting in dirty pages DP-7, DP-8, and DP-9 being persistently stored. The result of the successfully completed transaction that persistently stored dirty pages DP-7, DP-8, and DP-9 is shown in FIG. 12.

FIG. 12 is a block diagram showing the example of FIG. 11 after the transaction indicating that dirty pages DP-7, DP-8, and DP-9 are to be persistently stored has been successfully completed. As shown in FIG. 12, the processing of the transaction by the commit logic included storing page descriptors G, H, and I into the slots of Memory Resident Page Descriptor Ring 1000 indicated by head H 1002 prior to processing of the transaction, i.e. slots 1200, 1202, and 1204. Processing the transaction also included updating (i.e. advancing) head H 1002 to indicate the slot in Memory Resident Page Descriptor Ring 1000 immediately following the last slot used by the commit logic to store page descriptors added while processing the transaction, e.g. the slot immediately following slot 1204. Page descriptor G includes a pointer to page buffer 1042, which the commit logic used to store dirty page DP-7. Page descriptor H includes a pointer to page buffer 1046, which the commit logic used to store dirty page DP-8. Page descriptor I includes a pointer to page buffer 1050, which the commit logic used to store dirty page DP-9. Persistent page descriptor buffer 1022 was used by the commit logic to store a copy of page descriptor G, persistent page descriptor buffer 1026 was used by the commit logic to store a copy of page descriptor H, and persistent page descriptor buffer 1030 was used by the commit logic to store a copy of page descriptor I.

Figure 13:
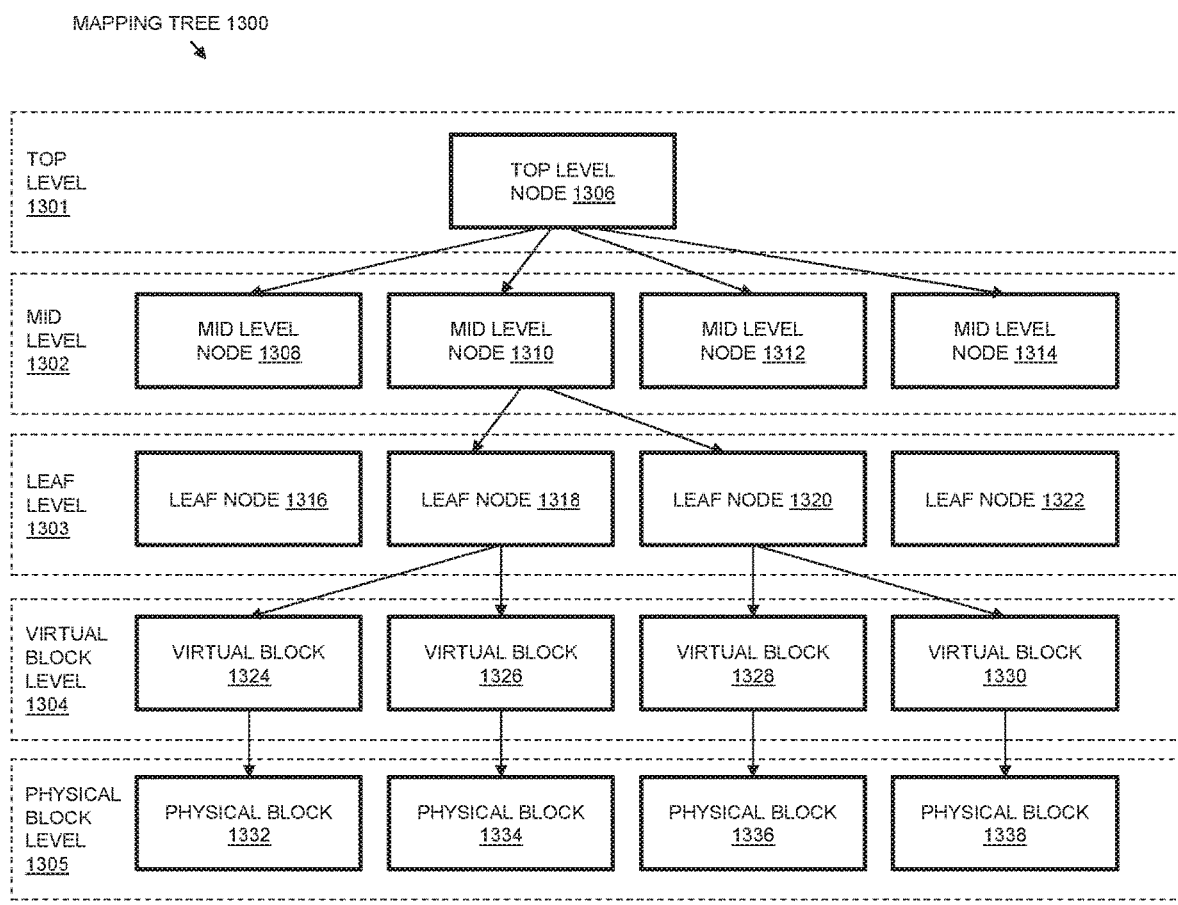
FIG. 13 is a block diagram showing an example of a mapping tree in some embodiments.

FIG. 13 is a block diagram showing an example of a Mapping Tree 1300 in some embodiments. The Mapping Tree 1300 is a simplified example of the Mapping Tree 158 shown in FIG. 1. Mapping Tree 1300 may be used by Host I/O Processing Logic 135 to store user data indicated by one or more host I/O write requests and provide access to previously stored user data in response to one or more host I/O read requests. Host I/O Processing Logic 135 may determine the location of the specific physical non-volatile storage that is mapped to a portion of the logical address space of a logical volume that is accessed by a read or write host I/O request by traversing Mapping Tree 1300. Mapping Tree 1300 may represent mappings between specific logical block addresses (LBAs) within a logical address space of the logical volume and corresponding physical pages of non-volatile data storage in Backend Non-Volatile Data Storage Drives 128 that are used to store user data written to those LBAs. Processing of each host I/O request that is directed to a logical volume may include a traversal of that logical volume's mapping tree in order to identify the physical page of non-volatile storage that corresponds to the LBA within the logical address space of the logical volume that is indicated by the host I/O request. As shown in the example of FIG. 13, Mapping Tree 1300 may consist of or include a tree structure having multiple levels of nodes, e.g. Top Level 1301 including Top Level Node 1306, Mid-Level 1302 including Mid-Level Nodes 1308, 1310, 1312, and 1314, Leaf-Level 1303 including Leaf-Level Nodes 1316, 1318, 1320, and 1322, Virtual Block Level 1304 including Virtual Blocks 1324, 1326, 1328, and 1330, and Physical Block Level 1305 including Physical Blocks 1332, 1334, 1336, and 1338. Each level above the Physical Block Level 1305 stores mappings (e.g. pointers) to next lower level nodes, as follows:

Top Level 1301: Each node corresponds to a logical volume, and stores mappings of the logical address space of the logical volume to one or more nodes in Mid-Level 1302.

Mid-Level 1302: Each node maps a corresponding segment of the logical address space of the logical volume (e.g. a range of LBAs within the logical address space) to one or more nodes in Leaf Level 1303.

Leaf Level 1303: Each node maps a smaller corresponding segment within the logical address space of the logical volume (e.g. a smaller range of LBAs than are mapped by each node in Mid-Level 1302) to pointers contained in one or more virtual blocks in Virtual Block Level 1304.

Virtual Block Level 1304: Contains virtual blocks that isolate LBAs in the logical volume's logical address space from pages of physical non-volatile data storage. Each virtual block in the Virtual Block Level 1304 corresponds to a physical block of contiguous non-volatile data storage, and contains pointers to individual physical pages of non-volatile data storage within a corresponding physical block.

Physical Block Level 1305: The level below the Virtual Block Layer 1304, containing physical blocks. Each physical block is a physically contiguous chunk of non-volatile data storage that may be used to store user data, and is made up of pages that may be indicated by pointers contained in the corresponding virtual block.

For example, each physical page may be 4 kilobytes (KBs), each physical block may be 2 megabytes (MBs), and each virtual block may contain a maximum of 512 pointers. In such an example, i) each leaf node may map 512 LBAs in a contiguous 2 megabyte (MB) segment of the logical address space of the logical volume using 512 pointers to pointers contained in virtual blocks, and ii) each virtual block may contain up to 512 pointers to 4 KB pages of non-volatile storage in a corresponding physical block. Those skilled in the art will recognize that the sizes given in the above example are only for purposes of explanation, and that the techniques described herein are not limited to any specific set of sizes. Those skilled in the art will further recognize that the number of levels and the numbers of nodes in each level shown in the simplified Mapping Tree 1300 of FIG. 13 are only given for purposes of concise illustration and clear explanation, and accordingly that the disclosed technology is not limited to use with mapping trees having a specific number of levels and/or specific numbers of nodes within each level.

In some embodiments, the disclosed flush logic may select the work-set of non-sequential page descriptors within the memory resident page descriptor ring at least in part by selecting a set of page descriptors that includes the page descriptor indicated by the tail prior to performing the flush operation, and that also includes one or more other page descriptors indicating page buffers that store dirty pages having LBAs that are mapped by the same branch (e.g. a single subtree) of a mapping tree that maps the LBA of the dirty page stored in the page buffer indicated by the page descriptor indicated by the tail prior to performing the flush operation. For example, a branch of the mapping tree may consist of a node in the mapping tree and all of its descendants. An example of a branch of Mapping Tree 1300 is shown in FIG. 13 as Mid-Level Node 1310, and all of its descendants, e.g. the leaf nodes indicated by one or more pointers in Mid-Level Node 1310 (e.g. Leaf Nodes 1318, and 1320), the virtual blocks indicated by one or more pointers in those leaf nodes (e.g. Virtual Blocks 1324, 1326, 1328, and 1330), and the physical blocks corresponding to those virtual blocks (e.g. Physical Blocks 1332, 1334, 1336, and 1338).

FIG. 14 is a flow chart of steps that may be performed in some embodiments.

At step 1400, the disclosed technology persistently stores dirty pages of cached user data received by a data storage system to page buffers that are allocated from a page buffer pool and indicated by corresponding page descriptors that are stored at a head of a temporally ordered page descriptor ring as the dirty pages are stored to the page buffers.

At step 1402, the disclosed technology performs a flush operation by selecting a work-set of non-sequential page descriptors within the page descriptor ring, flushing dirty pages from page buffers indicated by the page descriptors in the work-set to non-volatile data storage drives of the data storage system, and storing, for each one of the page buffers indicated by the page descriptors in the work-set, an indication that the page buffer is available for re-use.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   persistently storing dirty pages of cached user data received by a data storage system to page buffers that are allocated from a page buffer pool and indicated by page descriptors that are allocated at a head of a temporally ordered page descriptor ring as the dirty pages are stored to the page buffers; and
   performing a flush operation by selecting a work-set of non-sequential page descriptors within the page descriptor ring, flushing dirty pages from page buffers indicated by the page descriptors in the work-set to non-volatile data storage drives of the data storage system, and storing, for each one of the page buffers indicated by the page descriptors in the work-set, an indication that the page buffer is available for re-use;
   wherein a tail of the page descriptor ring indicates one of the page descriptors in the work-set prior to performing the flush operation; and
   wherein performing the flush operation further comprises:
      updating the tail of the page descriptor ring to indicate a page descriptor not contained in the work-set and located after the page descriptor in the work-set indicated by the tail of the page descriptor ring prior to performing the flush operation;
      generating a tail marker that includes the updated tail of the page descriptor ring and a location within the descriptor ring of each page descriptor in the work-set that is located above the updated tail of the page descriptor ring; and
      storing the tail marker at the head of the page descriptor ring.

2. The method of claim 1, wherein the page buffers are allocated from a page buffer pool in a persistent data storage resource that is separate from the non-volatile data storage drives of the data storage system; and wherein the page descriptor ring is located in a memory of a storage processor of the data storage system.

3. The method of claim 2, wherein selecting the work-set of non-sequential page descriptors within the page descriptor ring comprises selecting page descriptors indicating buffer descriptors that store dirty pages having logical block addresses that are mapped by a single branch of a mapping tree that is used by the storage processor to map logical block addresses to corresponding physical page locations on the non-volatile data storage drives.

4. The method of claim 3, further comprising:
maintaining, for the page buffer pool, a page buffer allocation bit map, wherein the page buffer allocation bit map includes a bit for each page buffer in the page buffer pool indicating whether that page buffer is currently available to store a dirty page; and
wherein storing the indication, for each one of the page buffers indicated by the page descriptors in the work-set processed by the flush operation, that the page buffer is available for re-use after completion of the flush operation includes modifying the bit corresponding to the page buffer in the page buffer allocation bit map to indicate that the page buffer is currently available to store a dirty page.

5. The method of claim 4, further comprising:
maintaining a persistent page descriptor buffer pool in the persistent data storage resource, wherein the persistent page descriptor buffer pool contains a plurality of persistent page descriptor buffers;
wherein each page descriptor in the page descriptor ring that indicates a page buffer storing a dirty page is associated with a persistent page descriptor buffer that is allocated from the persistent page descriptor buffer pool.

6. The method of claim 5, wherein the persistent page descriptor buffers allocated from the persistent page descriptor pool store copies of page descriptors in the page descriptor ring.

7. The method of claim 6, further comprising overprovisioning the page descriptor ring such that the page descriptor ring has a total capacity that exceeds a total capacity of the persistent page descriptor buffer pool.

8. The method of claim 7, wherein the persistent data storage resource comprises a battery-backed memory within the data storage system that is separate from the non-volatile data storage drives of the data storage system.

9. A computer program product including a non-transitory computer readable medium having instructions stored thereon, wherein the instructions, when executed on processing circuitry, cause the processing circuitry to perform the steps of:
persistently storing dirty pages of cached user data received by a data storage system to page buffers that are allocated from a page buffer pool and indicated by page descriptors that are allocated at a head of a temporally ordered page descriptor ring as the dirty pages are stored to the page buffers; and
performing a flush operation by selecting a work-set of non-sequential page descriptors within the page descriptor ring, flushing dirty pages from page buffers indicated by the page descriptors in the work-set to non-volatile data storage drives of the data storage system, and storing, for each one of the page buffers indicated by the page descriptors in the work-set, an indication that the page buffer is available for re-use;

wherein a tail of the page descriptor ring indicates one of the page descriptors in the work-set prior to performing the flush operation; and
wherein performing the flush operation further comprises:
updating the tail of the page descriptor ring to indicate a page descriptor not contained in the work-set and located after the page descriptor in the work-set indicated by the tail of the page descriptor ring prior to performing the flush operation;
generating a tail marker that includes the updated tail of the page descriptor ring and a location within the descriptor ring of each page descriptor in the work-set that is located above the updated tail of the page descriptor ring; and
storing the tail marker at the head of the page descriptor ring.

10. A data storage system comprising:
at least one storage processor including processing circuitry and a memory;
a plurality of non-volatile data storage drives communicably coupled to the storage processor; and
wherein the memory has program code stored thereon, wherein the program code, when executed by the processing circuitry, causes the processing circuitry to:
persistently store dirty pages of cached user data received by a data storage system to page buffers that are allocated from a page buffer pool and indicated by page descriptors that are allocated at a head of a temporally ordered page descriptor ring as the dirty pages are stored to the page buffers; and
perform a flush operation by selecting a work-set of non-sequential page descriptors within the page descriptor ring, flushing dirty pages from page buffers indicated by the page descriptors in the work-set to non-volatile data storage drives of the data storage system, and storing, for each one of the page buffers indicated by the page descriptors in the work-set, an indication that the page buffer is available for re-use;
wherein a tail of the page descriptor ring indicates one of the page descriptors in the work-set prior to performing the flush operation, and wherein the program code, when executed by the processing circuitry, further causes the processing circuitry perform the flush operation at least in part by causing the processing circuitry to:
update the tail of the page descriptor ring to indicate a page descriptor not contained in the work-set and located after the page descriptor in the work-set indicated by the tail of the page descriptor ring prior to performing the flush operation;
generate a tail marker that includes the updated tail of the page descriptor ring and a location within the descriptor ring of each page descriptor in the work-set that is located above the updated tail of the page descriptor ring; and
store the tail marker at the head of the page descriptor ring.

11. The data storage system of claim 10, further comprising:
wherein the data storage system includes a persistent data storage resource that is separate from the non-volatile data storage drives;
wherein the page buffers are allocated from a page buffer pool in the persistent data storage resource; and
wherein the page descriptor ring is located in the memory of the storage processor of the data storage system.

12. The data storage system of claim 11, wherein the program code, when executed by the processing circuitry, further causes the processing circuitry to select the work-set of non-sequential page descriptors within the page descriptor ring at least in part by causing the processing circuitry to select page descriptors indicating buffer descriptors that store dirty pages having logical block addresses that are mapped by a single branch of a mapping tree that is used by the storage processor to map logical block addresses to corresponding physical page locations on the non-volatile data storage drives.

13. The data storage system of claim 12, wherein the program code, when executed by the processing circuitry, further causes the processing circuitry to:
  maintain, for the page buffer pool, a page buffer allocation bit map, wherein the page buffer allocation bit map includes a bit for each page buffer in the page buffer pool indicating whether that page buffer is currently available to store a dirty page; and
  store the indication, for each one of the page buffers indicated by the page descriptors in the work-set processed by the flush operation, that the page buffer is available for re-use after completion of the flush operation at least in part by modifying the bit corresponding to the page buffer in the page buffer allocation bit map to indicate that the page buffer is currently available to store a dirty page.

14. The data storage system of claim 13, wherein the program code, when executed by the processing circuitry, further causes the processing circuitry to:
  maintain a persistent page descriptor buffer pool in the persistent data storage resource, wherein the persistent page descriptor buffer pool contains a plurality of persistent page descriptor buffers; and
  wherein each page descriptor in the page descriptor ring that indicates a page buffer storing a dirty page is associated with a persistent page descriptor buffer allocated from the persistent page descriptor pool.

15. The data storage system of claim 14, wherein the persistent page descriptor buffers allocated from the persistent page descriptor buffer pool store copies of page descriptors in the page descriptor ring.

16. The data storage system of claim 15, wherein the program code, when executed by the processing circuitry, further causes the processing circuitry to overprovision the page descriptor ring such that the page descriptor ring has a total capacity that exceeds a total capacity of the page descriptor pool.

17. The data storage system of claim 16, wherein the persistent data storage resource comprises a battery-backed memory within the data storage system that is separate from the non-volatile data storage drives of the data storage system.

* * * * *